(12) United States Patent  
Rodrigues et al.

(10) Patent No.: US 9,169,646 B2  
(45) Date of Patent: Oct. 27, 2015

(54) LOW PROFILE SLATE-STYLE SOLAR ROOFING SYSTEM

(71) Applicant: Building Materials Investment Corporation, Dallas, TX (US)

(72) Inventors: Tommy F. Rodrigues, Nutley, NJ (US); Sudhir Railkar, Wayne, NJ (US); Walter Zarate, Wayne, NJ (US); Matti Kiik, Richardson, TX (US)

(73) Assignee: Building Materials Investment Corporation, Dallas, TX (US)

( * ) Notice: Subject to any disclaimer, the term of this patent is extended or adjusted under 35 U.S.C. 154(b) by 0 days.

(21) Appl. No.: 13/834,672

(22) Filed: Mar. 15, 2013

(65) Prior Publication Data

US 2014/0259999 A1    Sep. 18, 2014

(51) Int. Cl.
| | |
|---|---|
| *E04D 13/18* | (2014.01) |
| *E04H 14/00* | (2006.01) |
| *E04D 13/00* | (2006.01) |
| *H02S 20/25* | (2014.01) |
| *H02S 40/34* | (2014.01) |

(52) U.S. Cl.  
CPC ............... *E04D 13/00* (2013.01); *H02S 20/25* (2014.12); *H02S 40/34* (2014.12); *H02S 40/345* (2014.12); *Y02B 10/12* (2013.01)

(58) Field of Classification Search  
CPC ......... E04D 13/00; H02S 20/25; H02S 40/34; H02S 40/345; Y02B 10/12  
USPC ......... 52/173.3, 220.1, 220.3, 220.5; 136/244  
See application file for complete search history.

(56) References Cited

U.S. PATENT DOCUMENTS

| | | | |
|---|---|---|---|
| 2005/0076948 A1* | 4/2005 | Komamine | 136/251 |
| 2008/0155908 A1* | 7/2008 | Nomura et al. | 52/173.3 |
| 2011/0048507 A1* | 3/2011 | Livsey et al. | 136/251 |
| 2011/0225904 A1* | 9/2011 | Railkar et al. | 52/173.3 |
| 2012/0304559 A1* | 12/2012 | Ishida | 52/173.3 |

\* cited by examiner

*Primary Examiner* — Brian D Mattei  
(74) *Attorney, Agent, or Firm* — Womble Carlyle Sandridge & Rice LLP

(57) ABSTRACT

A solar roofing panel has a rectangular body with solar cells exposed on the upper surface of the body and an electrical junction box on the lower surface of body along the forward edge portion thereof. A cutout is formed in the upper edge portion of the rectangular body at a corner thereof. When a plurality of solar panels are arranged on a roof in courses with an upper course partially overlapping a lower course, the junction boxes of roofing panels in the upper course are disposed in the cutouts of roofing panels of the lower course. Accordingly, the solar roofing panels present a low profile mimicking the profile of slate-style shingles.

9 Claims, 4 Drawing Sheets

LOW PROFILE SLATE-STYLE SOLAR ROOFING SYSTEM

TECHNICAL FIELD

This disclosure relates generally to roof mounted solar panel systems and more particularly to solar panels that are building integrated with a slate-style roof, meaning that the solar panels present a low profile and blend into or compliment the appearance of the roof.

BACKGROUND

Slate is one of the finest roofing materials because, among other things, it is fireproof, resists hail damage, and can have a service life of 100 years or more. While natural slate has been common for decades, resent years have seen the immergence of man-made slate roofing that can rival the look and durability of natural slate. Slate roofing also is considered an architectural match for certain home styles.

Slate roofing can be installed in a variety of ways. Traditionally, slate shingles were installed on roof decks with nails driven through holes in the shingles. However, this proved to present certain problems related, among other things, to the weight of the shingles and the consequent enhanced framing required, as well as other factors, which often caused cracking of the brittle slate material. More recently, an improved slate roof installation system has been developed by Elk Premium Building Products, Inc. (now GAF) and is marketed under the trademark TruSlate™. Generally speaking, the TruSlate™ roofing system involves the installation of underlayment and spaced apart metal battens extending horizontally along a roof deck. Spring tempered hangers are attached to the battens and extend down the roof deck to upwardly hooked ends. A waterproof membrane or liner is laid along a row of hangers and individual slate shingles are hung on the hangers in overlapping rows or courses along the roof deck. The result is a classic and stately slate roof that does not exhibit problems caused by stress and roof deck movement. U.S. Pat. Nos. 7,448,177 and 7,454,873 disclose the TruSlate™ roofing system in detail and the entire contents of these patents is hereby incorporated by reference.

Solar electrical energy also is becoming more common as energy prices rise and cultural trends toward greener ways of life are more prevalent. One way of supplementing electrical needs with solar energy is to mount arrays of photovoltaic solar panels on one's roof. The panels often are mounted within frames and are electrically coupled together and connected to a home's electrical service and/or to battery banks to provide electrical energy from the sun. While such arrays of solar panels indeed provide supplemental electricity, many consider them unsightly on a roof and therefore would not invest in such a system. This may be particularly true for homeowners with slate or slate-style roofs, which represent a large investment to obtain the architectural appearance of slate.

U.S. Pat. No. 8,215,070 (incorporated herein by reference and owned by the assignee of the present disclosure) discloses a TruSlate™ type roofing system that includes solar panels that tend to blend into the architecture of surrounding field slates of a slate roof. However, even with the system disclosed in said patent, the solar panels when installed may not blend ideally into architecture of the roof. More particularly, the solar panels may not be completely flush with surrounding field slates because sufficient space for junction boxes and wiring must be provided beneath each of the solar panels. U.S. Pat. No. 8,215,070 suggests incorporating some of the wiring into the battens of the system, but junction boxes of individual solar panels and perhaps nano-inverters still must be accommodated in some fashion, which may prevent the solar panels from lying flush with surrounding shingles and thereby forming a low profile installation.

A need exists for a roof-mounted photovoltaic solar energy collection system particularly for slate-style roofs that is straightforward to install, easily updated to higher electrical production levels, and that is more fully building integrated, meaning that it blends into the architecture of the building and is low profile to blend with surrounding field shingles of the roof. It is to the provision of such a system that the present invention is primarily directed.

SUMMARY

Briefly described, a slate-style solar roof comprises a roof deck and a plurality of generally planar solar panels arranged in courses on the roof deck. The solar panels may be among surrounding slate field shingles. A lower edge portion of each solar panel in a first course overlaps an upper edge portion of at least one shingle of a next lower second course. The shingles of the second course are staggered with respect to the shingles of the first course by approximately one-half the width of a solar panel. Each solar panel has a top surface facing away from the roof and a bottom surface facing the roof. A plurality of solar cells is disposed on each solar panel and the cells arranged for exposure to sunlight on the top surface of the panel and consequent production of electrical energy. The solar cells are electrically interconnected to aggregate electrical energy produced by the cells.

A junction box is mounted on the bottom surface of each solar panel and is strategically located within the lower edge portion thereof. Electrical connections are incorporated into each solar panel for directing the aggregated electrical energy produced by the solar cells to the junction box. The junction box includes positive and negative outputs to which wires and connectors are coupled to connect each solar panel to other solar panels on the roof deck. A cutout is formed within the upper edge portion of each solar panel. The cutout is sized and located such that the junction boxes of a first course of solar panels align with and nestle within the cutout of a solar panel in a next lower course of solar panels. The outputs of the junction boxes are located to align with a chase formed above the top edge of solar panels of the next lower course and the connectors also reside in the chase when connected. In this way, the profile of the plurality of solar panels on the roof is significantly lowered so that the solar panels resemble standard a standard slate-style shingle installation.

These and other aspects, features, and advantages of the invention disclosed herein will become more apparent upon review of the detailed description set forth below when taken in conjunction with the accompanying drawing figures, which are briefly described as follows.

DETAILED DESCRIPTION

Figure 1:
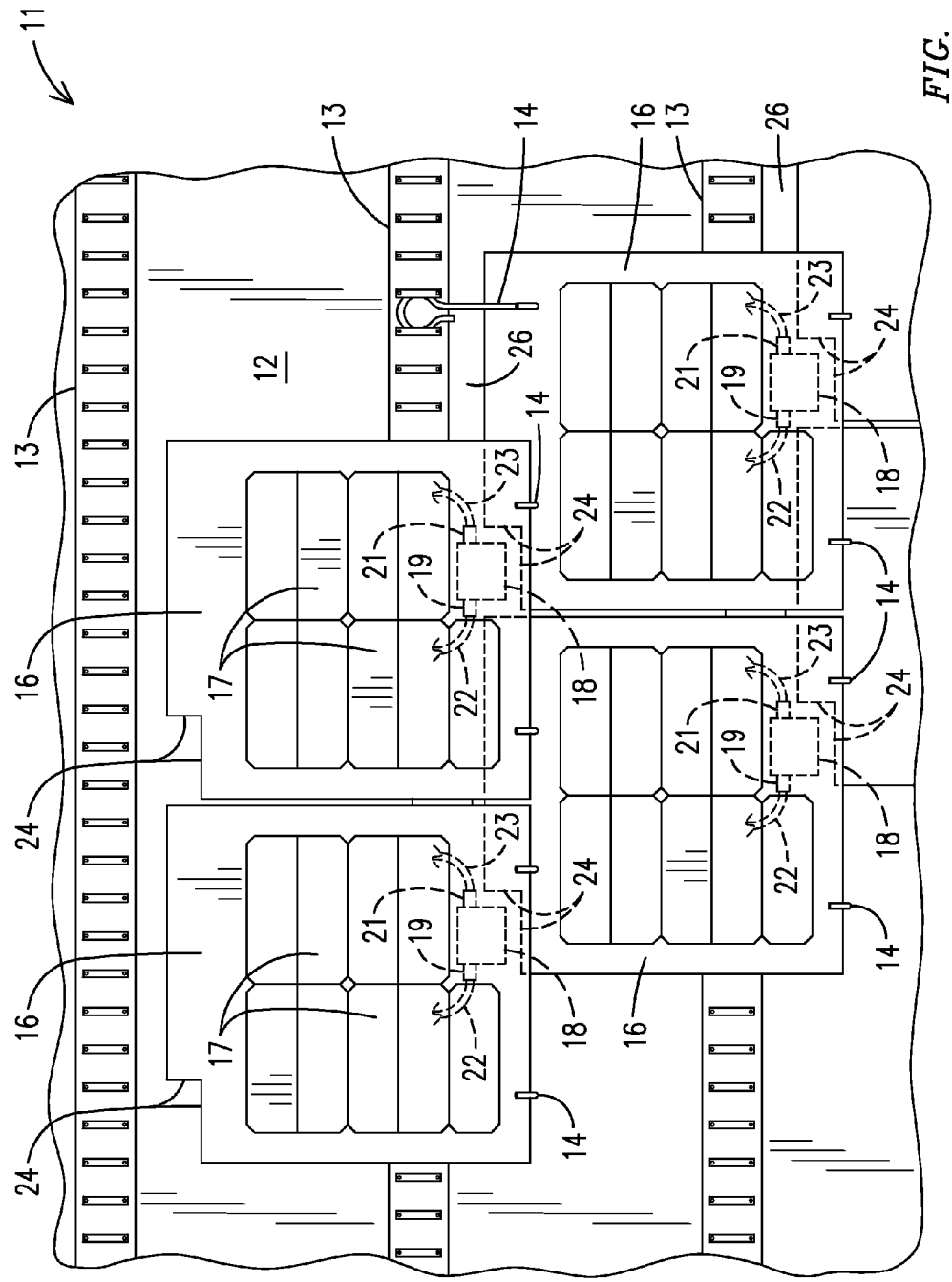
FIG. 1 is a top plan view of a section of a roof deck having slate-style solar panels mounted with a TruSlate™ mounting system.

Reference will now be made to the drawing figures, wherein like reference numerals indicate like parts throughout the several views. FIG. 1 illustrates a slate-style solar roof system 11 that embodies aspects of the invention in one preferred form. The roof system 11 comprises a roof deck 12, which may be covered with a membrane or other underlayment if desired. According to the disclosures of the patent documents incorporated by reference, a plurality of battens 13 is attached to the roof deck in parallel rows. Spring steel hangers 14 are attached to the battens and extend down the roof deck therefrom to terminate in upturned hooks. In this TruSlate™ style system, slate shingles and solar panels according to the invention are installed on the roof and each shingle or solar panel is "hung on" and supported by a pair or more of hangers 14 as shown and described in the incorporated patent documents.

According to the present invention, a plurality of solar panels 16 are installed on the roof deck and the panels 16 are hung from the hangers just as slate shingles would be. FIG. 1 shows only solar panels, but it should be understood that an installation might include both solar panels and slate field shingles with the solar panels blending into the field of slate shingles. Each solar panel 16 is substantially rectangular and has an upper edge portion (relative to the roof slope) and a lower edge portion. An array of solar cells 17 is arranged on each panel 16 so that they are exposed to sunlight impinging on the surface of the panel. Consequently, the solar cells 17 produce electrical energy when the solar panels are exposed to sunlight. As described in more detail below, the solar cells are interconnected in series to aggregate the electrical energy they create. A junction box 18 is mounted on the bottom surface of each solar panel and is located within the lower edge portion of the panel displaced to one side of a centerline of the panel.

Each junction box 18 receives the aggregated electrical energy from the solar cells 17 and has a negative electrical output 19 and a positive electrical output 21. The negative and positive outputs of each junction box are aligned with each other and extend from opposites sides of their junction box near the upper edge thereof. Electrical wires 22 and 23 extend from the negative output 19 and positive output 21 respectively and each wire terminates in a connector 32 or 33 (FIG. 3) with one of the connectors being a male member and the other being a mating female member. As detailed below, the male member of one solar panel of the installation is mated with the female member of an adjacent solar panel and so on to aggregate the electrical energy produced by all of the solar panels for delivery to a remote inverter for converting the DC electrical energy of the solar panels to usable AC electrical energy. While only 4 solar panels are shown in FIG. 1 for clarity, it will be understood that a typical installation may include dozens of solar panels interconnected as described.

A cutout 24 is formed in each solar panel within the upper edge portion and, in the illustrated embodiment, is formed in an upper corner of each solar panel. Each cutout 24 is sized such that when solar panels are arranged in overlapping staggered courses as shown, the junction boxes 18 of upper courses align with and nestle in the cutouts 24 of solar panels in the next lower course of panels. Further, when installed, a chase 26 is defined between the top edge of each solar panel and the batten 13 above. The junction boxes are sized and configured so that the electrical outputs 19 and 21 of junction boxes 18 align with and at least partially reside in the chase. Furthermore, the size of the chase is sufficient to contain the mated connectors of adjacent solar panels as described in more detail below. With the described arrangement, the solar panels 16 are able to form a "low profile." That is, they do not tend to protrude in an unsightly manner above the slate field shingles of a slate-style roof. Further, with a judicious choice of the material on the upper surface of the solar panels, the solar panels can closely match the appearance of surrounding slate field shingles so that the solar panels are substantially camouflaged on a roof of slate field shingles.

Figure 2:
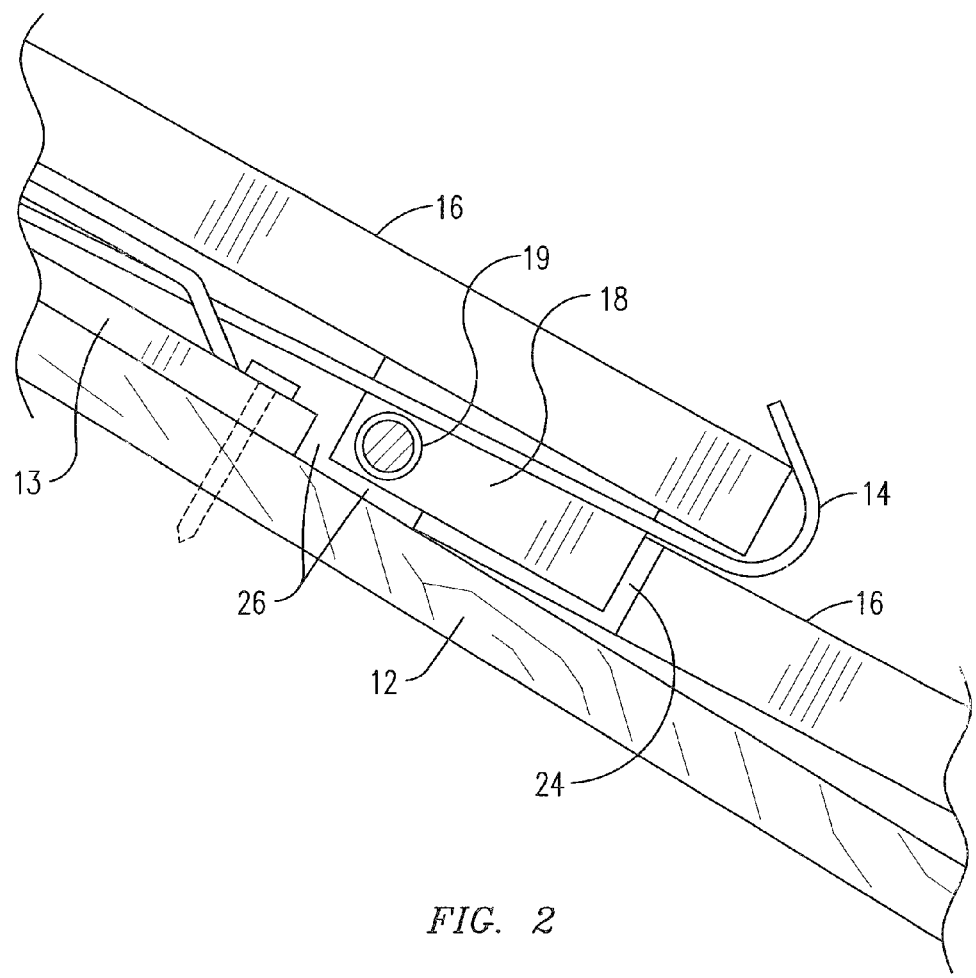
FIG. 2 is a side view with somewhat exaggerated proportions illustrating location of a junction box and output wires of the junction box.

FIG. 2 shows the just described arrangement in more detail from the side of the overlapping portions of two courses of solar panels. Thicknesses may be exaggerated in FIG. 2 for clarity, but aspects of the invention are depicted. A metal batten 13 is installed along the roof deck 12 as described and a plurality of spring steel hangers 14 are attached to and extend down the roof from the batten. Each solar panel 16 in a course of solar panels is supported along its bottom edge within a hook of at least two hangers 14 as shown. The hangers also bear on the upper edge portions of solar panels in the next lower course to help hold down these upper edge portions. The cutout 24 is shown formed in an upper edge of the lower solar panel 16 and the chase 26 is shown between the top edge of the lower solar panel 16 and the batten 13. In an actual installation, water proofing membranes 28 (FIG. 3) are installed beneath the solar panels as described in the incorporated patent documents, but these are not illustrated in FIG. 2 for the sake of clarity.

A junction box 18 is mounted to the bottom surface of the upper solar panel 16 and depends downwardly therefrom. In the illustrated embodiment, the junction box is spaced from the lower edge of its solar panel and is offset just to the right of a centerline of the panel, as perhaps best illustrated in FIG. 4. However, this preferred arrangement is not limiting and the junction boxes might be otherwise positioned and the cutouts configured accordingly within the scope of the invention. In any case, the junction boxes and cutouts are configured so that junction boxes 18 of a solar panel of one course align with and nestle in corresponding cutouts 24 of a solar panel in a lower course. Further, the opposed outputs 19 and 21 on opposite sides of the junction box are positioned to align and at least partially reside within the chase 26 above the solar panels of the lower course as shown.

It will be appreciated from FIG. 2 that when solar panels of the present invention are installed using a TrueSlate™ hanging system, the solar panels of upper courses lay flatter on solar panels of the next lower course. This is because their junction boxes reside below the surfaces of solar panels in the next lower course when nestled within the cutouts 24 and also because their electrical outputs 19 and 21 and associated connectors 31 (FIG. 3) reside in the chase above the top edges of the solar panels of the lower course. Accordingly, a "low profile" solar panel installation results with the profile of solar panels 16 resembling or mimicking the profile of surrounding field slates of the roof. The solar panels are thus camouflaged on a slate-style roof and have an appearance that is much more acceptable to owners of homes with slate or slate-style roofs.

Figure 3:
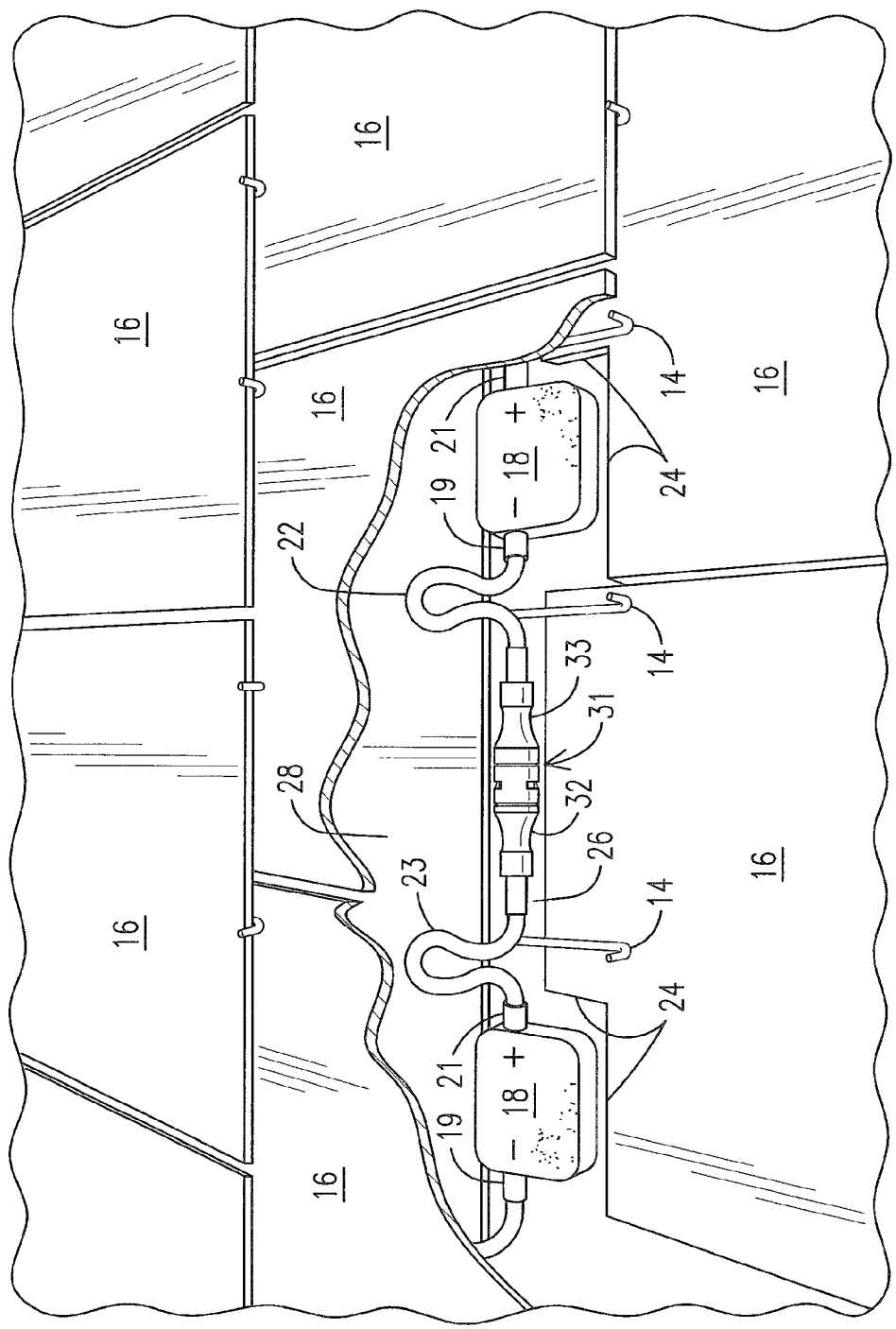
FIG. 3 is a perspective partially cutout view of a section of a roof having slate-style solar panels mounted according to the invention and illustrating a preferred placement of junction boxes and a preferred wire management.

FIG. 3 illustrates the wire and connector management according to further aspects of the present invention. Two solar panels 16 of an upper course are shown partially cutaway to reveal the components below. As described, junction boxes 18 are mounted to the bottom surfaces of solar panels of the upper course and these junction boxes align with and nestle in the cutouts in the upper corners of solar panels of the next lower course as shown. In FIG. 3, a waterproof membrane 28 is shown beneath the solar panels with its lower edge portion covering a batten of the system to which hooks 14 are attached. The chase 26 above the top edges of solar panels in the lower course of solar panels is clearly shown in FIG. 3.

A positive wire 23 extends from the positive output 21 of each junction box and a negative wire 22 extends from the negative output of each junction box. The positive wire terminates in a male portion 32 of a connector 31 and the negative wire 22 terminates in a female portion 33 of the connector 31 (or vice versa). The male portion of the junction box of one solar panel is coupled to the female portion of the junction box of an adjacent solar panel to connect the two solar panels electrically together in series in the illustrated embodiment. The connector 31 is nestled within the chase 26 above the solar panels of the lower course and the positive and negative wires are looped up beneath the solar panels of the upper course as shown. This allows for expansion and contraction and other movements of the roof that may occur. It has been found that connectors marketed under the designation MC4Plus are preferable in that they have a connected thickness of about 0.5 inch, which is significantly less than some other connectors, and so MC4Plus connectors fit neatly within the chase 26.

With the just described arrangement, the junction boxes, outputs, wires, and connectors of solar panels in a course nestle neatly beneath the solar panels within the cutouts and chases formed therein. A low profile installation is thereby possible with the present invention.

Figure 4:
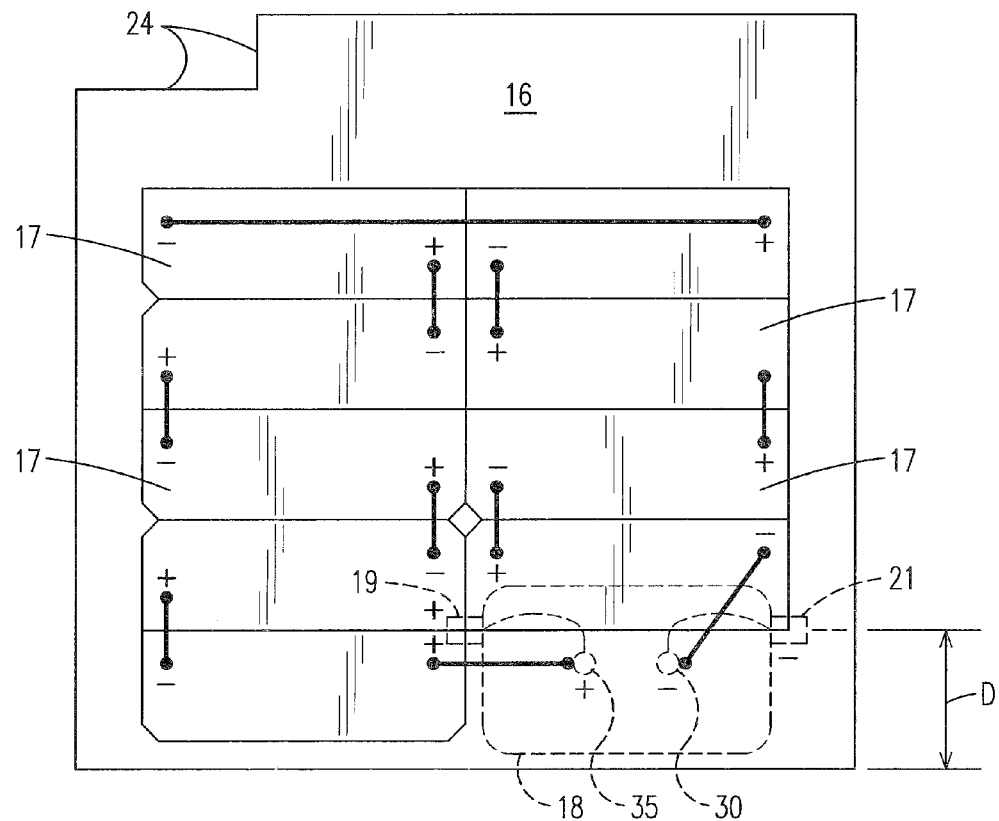
FIG. 4 is a detailed illustration of a solar panel according to the invention illustrating placement and connection of the solar cells and their connection to the junction box.

FIG. 4 is a more detailed illustration of a solar panel according to one aspect of the present invention. As mentioned, the solar panel 16 is substantially rectangular in shape and has an upper edge portion and a lower edge portion. An array of solar cells 17 is arranged on the solar panel 16. The arrangement of the solar cells 17 is such that one cell at the bottom right of the solar panel is eliminated to make room for the junction box 18 and electrical connections thereto. The solar cells are interconnected in series as illustrated to aggregate the electrical energy produced by the solar cells when exposed to sunlight. The interconnected solar cells are in turn electrically connected to terminals 30 and 35 respectively on the solar panel. The junction box 18 becomes electrically connected to these terminals with mounted to the bottom side of the solar panel such that DC electrical energy of the solar panel is made available at the outputs 19 and 23 of the junction box.

It has been found that a modified junction box design and placement that results in a distance D of about 55.72 millimeters between the bottom edge of a solar panel and the location of the electrical outputs results in a good alignment of the outputs with the chase as described above. Further, the junction box itself is designed with a reduced thickness compared to standard solar panel junction boxes that allows it to fit within the cutout of a shingle in a next lower course with some space between the junction box and the roof deck. This ensures the lowest possible profile installation and also provides for air circulation around the junction boxes.

Figure 5:
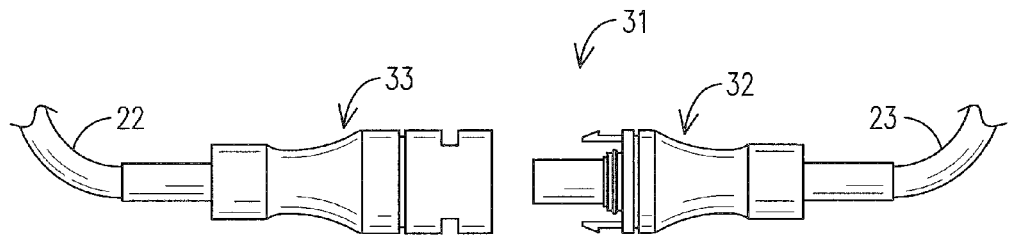
FIG. 5 illustrates an MC4Plus type wiring connector that is suitable for use with the present invention.

FIG. 5 shows a typical low profile MC4Plus connector of a type commonly used with solar installations. The connector 31 is comprised of a male portion 32 and a female portion 33. The male portion has an O-ring that forms a water tight seal when the portions are connected and locking tabs that prevent the portions from disconnecting over long periods of use. As mentioned, the MP4Plus connector is a low profile connector with a connected thickness of about 0.5 inches and is thus preferable to other connectors used in solar installations that have greater thicknesses. The thickness of the MP4Plus connector is such that it fits well within the chase defined above the upper edges of solar panels as detailed above.

The invention has been described herein in terms of preferred embodiments and methodologies considered by the inventor to represent the best mode of carrying out the invention. It will be understood by the skilled artisan; however, that a wide range of additions, deletions, and modifications, both subtle and gross, may be made to the illustrated and exemplary embodiments within the scope of the invention. For example, the junction boxes may be displaced to the other side of a centerline of the solar panels and the notches formed in the opposite upper corners of the solar panels. Indeed, the junction boxes may be otherwise located than those of the illustrated embodiments with the cutouts correspondingly located and sized to receive the junction boxes. Electrical connections, while illustrated as being series connections, might also be parallel connections or a combination of series and parallel connections as desired. These and a variety of other modifications might well be made by the skilled artisan without departing from the spirit and scope of the invention, which is delimited only by the claims hereof.

What is claimed is:

1. A slate-style solar roof comprising:
   a roof deck;
   a plurality of generally planar solar panels arranged in courses on the roof deck with a lower edge portion of each solar panel in a first course overlapping an upper edge portion of at least one solar panel of a next lower second course, the solar panels of the second course being staggered with respect to the solar panels of the first course;
   the upper edge portions of at least some of the solar panels including top corners;
   each solar panel having a top surface facing away from the roof and a bottom surface facing the roof;
   a plurality of solar cells on each solar panel arranged for exposure to sunlight on the top surface of the panel and consequent production of electrical energy, the solar cells being electrically interconnected to aggregate electrical energy produced by the solar cells;
   a junction box on the bottom surface of each solar panel located within the lower edge portion thereof;
   electrical connections for directing the aggregated electrical energy produced by the solar cells to the junction box; and
   a cutout formed within at least one of the top corners of the upper edge portion of each solar panel with the cutout extending through the panel, the cutout being sized and located such that the cutouts of a lower second course of solar panels are covered by the lower edge portions of solar panels in an upper first course of solar panels with the junction boxes of the first course of solar panels residing within the cutout of a solar panel in the second course of solar panels to lower the profile of the plurality of solar panels on the roof.

2. A slate-style solar roof as claimed in claim 1 wherein the solar panels of the second course are staggered approximately half of a width of the solar panels with respect to the solar panels of the first course.

3. A slate-style solar roof as claimed in claim 1 wherein the solar panels are supported on hangers that are secured to elongated battens extending along the roof and wherein each of the elongated battens is spaced a distance from the upper edge of a course of shingles below the batten to define a chase therebetween.

4. A slate-style solar roof as claimed in claim 3 wherein each junction box has a positive outlet on one side of the junction box and a negative outlet on an opposite side of the junction box, the positive and negative outlets being located so that they align substantially with the chase.

5. A slate-style solar roof as claimed in claim 4 further comprising a positive connecting wire projecting from the positive outlet of each junction box and a negative connecting wire projecting from the negative outlet of each junction box and connectors on ends of the wires connecting each junction box electrically to the junction box of an adjacent solar panel.

6. A slate-style solar roof as claimed in claim 5 wherein the connectors are disposed within the chase.

7. A slate-style solar roof as claimed in claim 6 wherein the wires are disposed beneath the solar panels.

8. A solar panel comprising:
 a generally rectangular body having an upper surface and an opposed lower surface, an upper edge portion and an opposed lower edge portion;
 solar cells located for exposure to sunlight falling on the upper surface of the solar panel for consequent production of electrical energy;
 a junction box on the lower surface of the rectangular body of the solar panel within the lower edge portion thereof; and
 a cutout within the upper edge portion of the rectangular body and extending completely through the body;
 the cutout sized and positioned to be covered by the lower edge portion of a solar panel of a next higher course of like solar panels and to receive the junction box of a like solar panel of the next higher course arranged with its lower edge portion overlapping the upper edge portion of the solar panel.

9. The solar panel of claim 8 wherein the cutout is located in an upper corner of the generally rectangular body and sized to receive the junction box of a like solar panel that is staggered with respect to the solar panel by approximately half of a width of the rectangular body.

\* \* \* \* \*